United States Patent [19]
Karlock

[11] Patent Number: 5,220,426
[45] Date of Patent: Jun. 15, 1993

[54] CIRCUITRY FOR REMOVING INFORMATION FROM, OR MODIFYING INFORMATION IN, THE VERTICAL INTERVAL OF A TELEVISION SIGNAL

[76] Inventor: James A. Karlock, 3311 N.E., 35th St., Portland, Oreg. 97212

[21] Appl. No.: 419,037

[22] Filed: Oct. 10, 1989

Related U.S. Application Data

[63] Continuation of Ser. No. 152,671, Feb. 5, 1988, Pat. No. 4,870,297.

[51] Int. Cl.⁵ .............................................. H04N 3/24
[52] U.S. Cl. .................................... 358/165; 358/150; 358/148; 307/350; 328/115; 328/139
[58] Field of Search ............... 358/153, 188, 165, 150; 307/350, 530; 328/115, 139

[56] References Cited

U.S. PATENT DOCUMENTS

| | | | |
|---|---|---|---|
| 4,336,554 | 6/1982 | Okada | 358/124 |
| 4,467,358 | 8/1984 | Switsen | 358/153 |
| 4,695,901 | 9/1987 | Ryan | 380/5 |

FOREIGN PATENT DOCUMENTS

| | | | |
|---|---|---|---|
| 0117382 | 9/1980 | Japan | 358/188 |
| 0147276 | 9/1983 | Japan | 358/153 |
| 0146663 | 6/1988 | Japan | 358/153 |

*Primary Examiner*—James J. Groody
*Attorney, Agent, or Firm*—Dellett, Smith-Hill and Bedell

[57] ABSTRACT

Composite sync is separated from a video signal and integrated in order to produce a vertical control pulse. This pulse is then applied to the input of a one-shot multivibrator which provides an output essentially equal in duration to the time from the end of vertical sync to the start of the active picture, blanking the entire vertical interval with the exception of the vertical sync pulses. Optionally, a second one-shot multivibrator may be triggered at the horizontal sync rate and used to inhibit blanking during the times corresponding to equalizing, horizontal sync and color burst in order to preserve these legitimate parts of the signal. The first one-shot multivibrator may be replaced by a counter which counts at the horizontal rate and is reset by the vertical pulse. An increase in accuracy allows blanking of the period just before the vertical sync. Also, video presence may be sensed with a simple low-pass filter and CMOS gate and used to apply power to the main processing circuitry thus extending battery life. Blanking may be achieved by the use of a FET which simply shorts the video to signal ground during periods when blanking is desired.

32 Claims, 8 Drawing Sheets

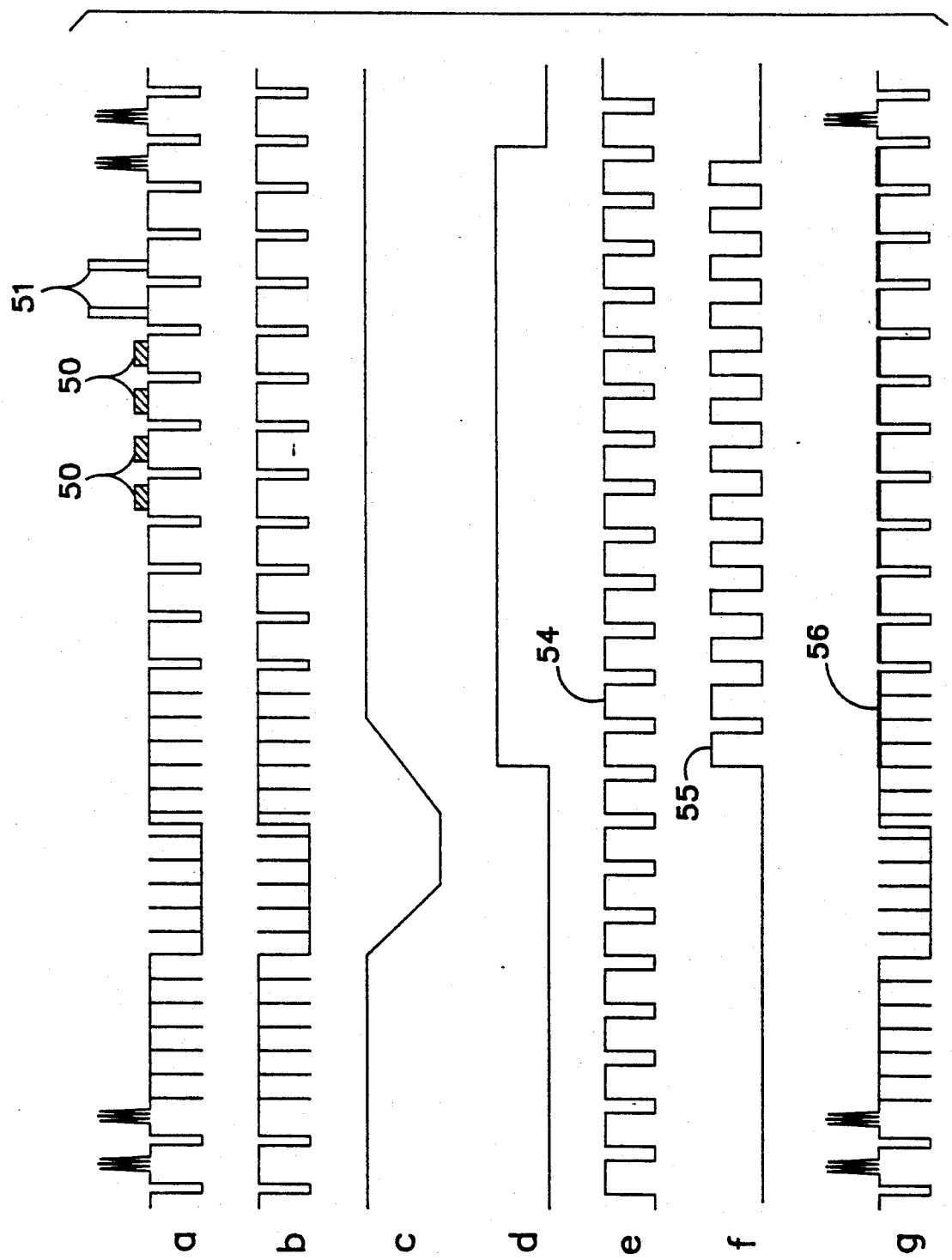

CIRCUITRY FOR REMOVING INFORMATION FROM, OR MODIFYING INFORMATION IN, THE VERTICAL INTERVAL OF A TELEVISION SIGNAL

CROSS-REFERENCE TO RELATED APPLICATION

This is a continuation of co-pending application Ser. No. 07/152,671 filed Feb. 5, 1988, now U.S. Pat. No. 4,870,297.

BACKGROUND OF THE INVENTION

This invention relates to circuitry for removing information from, or modifying information in, the vertical interval of a television signal.

Various video processes add information to the vertical interval of a television signal. Frequently these signals are left in the final signal product with undesirable results. Some cable TV decoders, for example, leave white reference pulses on television lines 20-22 which can appear at the top of a monitor as a flashing bright line.

It is usual to place SMPTE time code on edited master video tapes. When a small producer uses inexpensive equipment to provide copies of these tapes, the time code will appear on the copies he supplies to his customers. Also, tapes processed with an image enhancing system as described by Faroudja in U.S. Pat. No. 4,459,613 may, on occasion, be played back without the post-processor also described in U.S. Pat. No. 4,459,613. In such a case, lines 10-16 will contain a pilot signal.

Professional environments frequently use under-scanned monitors to show all four edges of the TV picture. Such monitors show ordinary VITS test signals at the top of the screen which can be quite distracting.

Previously, in order to alleviate the foregoing problems, it was necessary either to use an expensive processing amplifier or a special purpose apparatus such as the above mentioned Faroudja system. Apparatus of this kind was bulky, expensive and frequently consumed considerable power.

Also, consumer video tape recorders have a timing discontinuity near the bottom of the television screen which can be quite distracting on some monitors.

Furthermore, some television broadcasts of movies use a wide screen format wherein the full width of the television picture is matched to the full width of the original movie. Since the movie is of a wider aspect ratio than the television screen, the top and bottom of the television screen is then devoid of picture information and is sometimes filled with colored bands. This result may be annoying to a person who prefers black as would be the case in a movie theater.

DESCRIPTION OF PRIOR ART

In general, television processing amplifiers were known in the art before 1950. Various other circuits have also been used which alter the television signal and may or may not remove undesired information.

A battery operated video processor which blanks or optionally offsets only the three lines which comprise the vertical synchronizing signal is described in Switsen U.S. Pat. No. 4,467,358. Palminteri U.S. Pat. No. 4,691,354 describes a pay TV system vertical interval data blanker that blanks only lines 10-14 in the vertical interval. The rest of this region is left untouched. Okzeki U.S. Pat. No. 4,625,241 describes the insertion of a filter during line 16 only. Okada et al U.S. Pat. No. 4,336,554 discloses a system in which a video signal is selectively blanked during the vertical interval by turning on a transistor connected between a video input terminal and ground.

SUMMARY OF THE INVENTION

One object of the present invention is to provide unusually economic removal or attenuation of undesired information or noise from the vertical blanking interval of a video signal.

A further object of the present invention is to provide apparatus for video signal processing consuming such low power that battery operation is preferable to operation from the utility supply.

A still further object of the present invention is to save power by activating processing circuitry only when video is sensed.

Another object of the present invention is to reduce the space taken up by the processing device.

The foregoing objects are achieved by separating composite sync from a video signal and integrating the same in order to produce a vertical control pulse. This pulse is then applied to the input of a one-shot multivibrator which provides an output essentially equal in duration to the time from the end of vertical sync to the start of the active picture, blanking the entire vertical interval with the exception of the vertical sync pulses. Optionally, a second one-shot multivibrator may be triggered at the horizontal sync rate and used to inhibit blanking during the times corresponding to equalizing, horizontal sync and color burst in order to preserve these legitimate parts of the signal.

Further, the first one-shot multivibrator can be replaced by a counter which counts at the horizontal rate and is reset by the vertical pulse. An increase in accuracy allows blanking of the period just before the vertical sync. Also, video presence may be sensed with a simple low-pass filter and CMOS gate and used to apply power to the main processing circuitry thus extending battery life.

Blanking may be achieved by the use of a FET which simply shorts the video to signal ground during periods when blanking is desired. Modification of existing signals may be achieved by placing an element such as a resistor, capacitor, inductor or combinations thereof in series with the FET, thus implementing attenuator, band-stop or band-pass operation.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 4 shows the waveforms associated with the block diagram of FIG. 3,

FIG. 8B shows waveforms associated with the sync separator of FIG. 8A, FIGS. 9A–9B are schematics diagrams of the preferred embodiment of the video sensor and power switch.

DETAILED DESCRIPTION OF A PREFERRED EMBODIMENT

Figure 1:
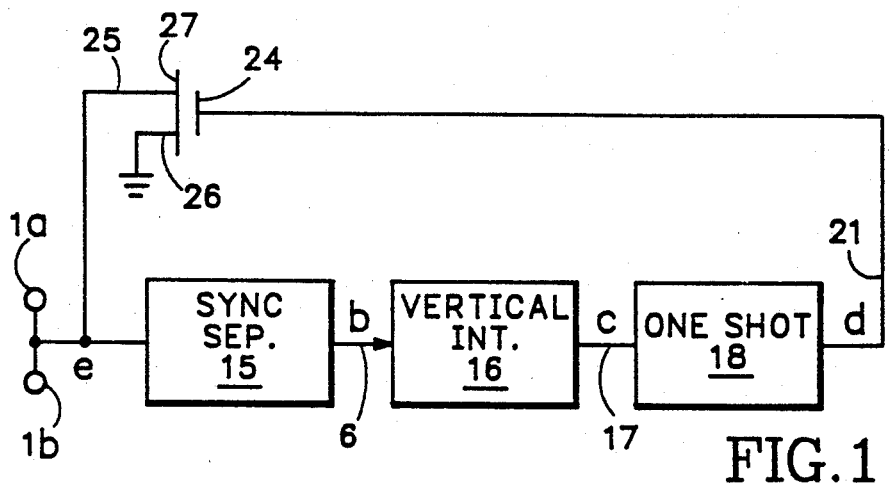
FIG. 1 is a block diagram of one embodiment of the invention.
Figure 2:
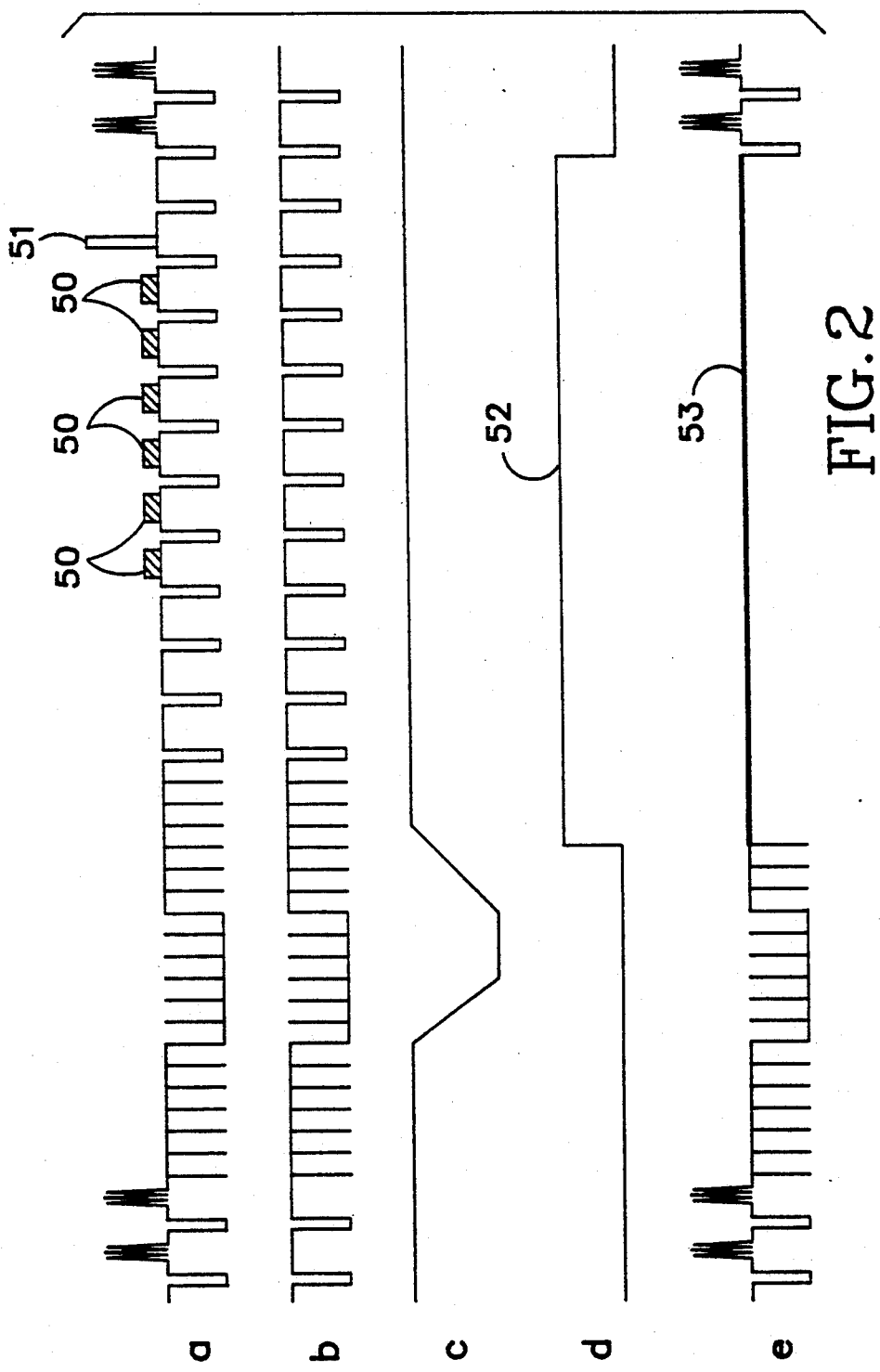
FIG. 2 shows the waveforms associated with the block diagram of FIG. 1.

Referring to FIGS. 1 and 2, a video signal such as that shown in waveform 2a is received at terminal 1a, which is connected to an output terminal 1b. The video signal is passed on to the sync separator 15 which provides composite sync free of video information as indicated in waveform 2b. Lead 6 passes this composite sync to vertical integrator 16 for providing a vertical control pulse 2c. The trailing edge of pulse 2c is used to trigger a one-shot multivibrator 18 which provides a pulse 2d. This pulse 2d is applied via lead 21 to the gate 24 of FET 27, the source 26 of which is connected to ground while the drain 25 is connected to video input terminal 1a. The pulse on lead 21 is positive with respect to ground during time period 52 of the one-shot multivibrator. FET 27 is turned on in response to pulse 52, establishing a low impedance connection between terminals 1a and 1b and ground, effectively suppressing any signals on the video during that time period. A typical original waveform, FIG. 2a, with unwanted information 50 and 51 produces a modified waveform, FIG. 2e, with the unwanted signals suppressed at time 53.

Figure 3:
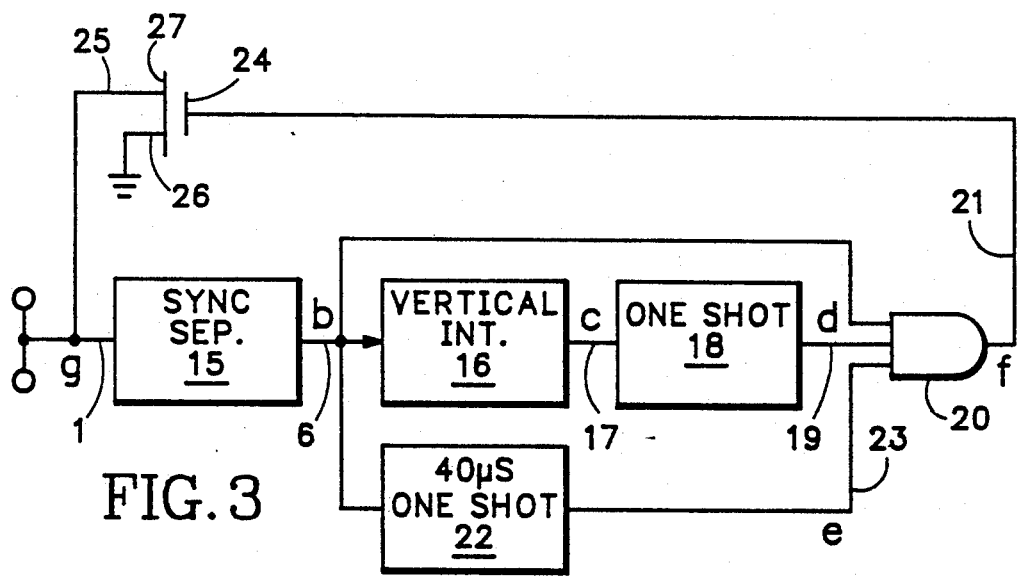
FIG. 3 is a block diagram of a more complex embodiment of the invention.

It is frequently desired to leave the normal synchronizing pulses unaffected by the blanking process. To that end, FIG. 3 shows additional circuitry that preserves these pulses. Line 6 delivers composite sync 4b to one-shot 22, which is arranged to have an "on time" of more than ½ and less than 1 full line period. Its output 4e consists of closely spaced positive pulses 54 which are applied to AND gate 20 via lead 23. AND gate 20 also receives composite sync 4b via lead 6. One skilled in logic gates will recognize that the output of AND gate 20 will correspond to waveform 4f containing positive suppression pulses 55. The rising edges of the pulses 55 are delayed with respect to the rising edges of the pulses of waveform 54 by the duration of the equalizing and sync pulses received from sync separator 15. This waveform is applied, via lead 21, to the FET switch as previously described. The resultant output waveform 4g shows the "deleted" portions 56 with the sync pulses left intact.

Figure 5:
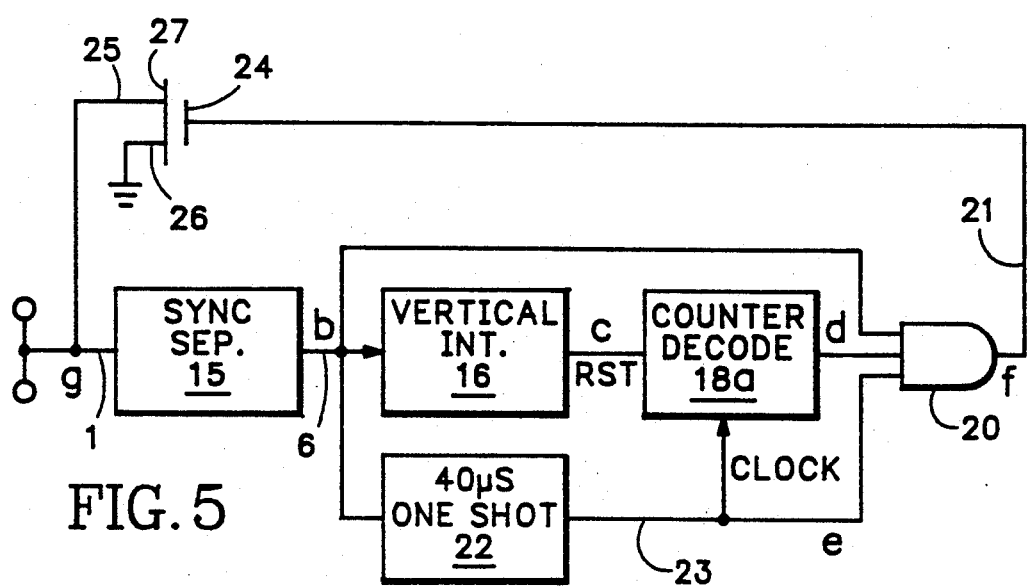
FIG. 5 illustrates a still more complex embodiment of the invention.
Figure 6:
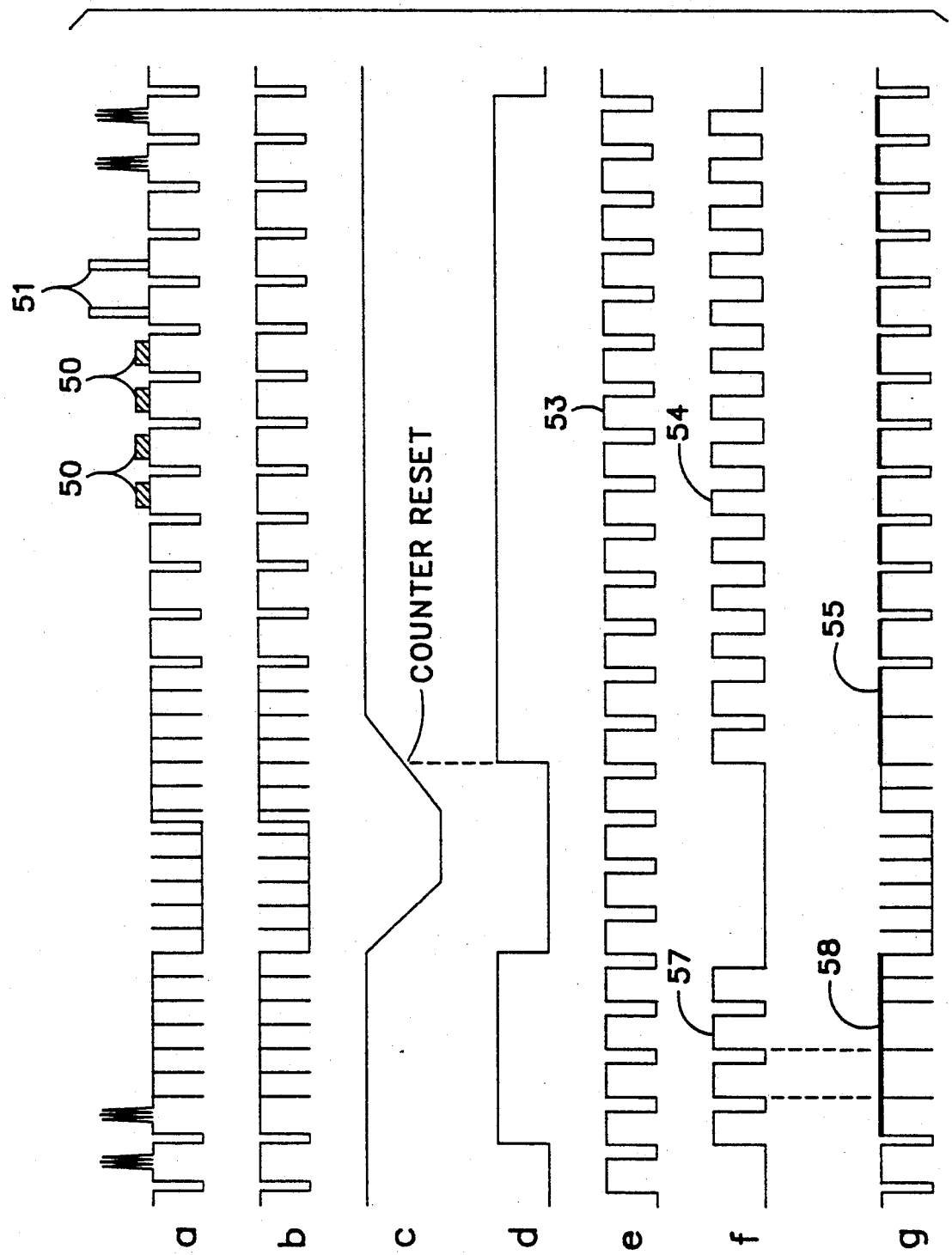
FIG. 6 shows the waveforms associated with the block diagram of FIG. 5.

A further embodiment of the invention is illustrated in FIG. 5 with the associated waveforms shown in FIG. 6. Digital counter and decoder 18a counts the pulses, supplied on lead 23, produced by the previously described one-shot 22. These pulses occur once per line of input video. Although the counter and decoder 18a can be set to provide the waveform as shown in 4d, it preferably produces waveform 6d in a well understood manner. Waveform 6d is applied to AND gate 20 in combination with waveforms 6b and 6e on leads 6 and 19 respectively, to provide waveform 6f applied to FET 27 as previously described. By simply changing the counter decoding, a selected number of lines at the top and bottom of the active picture area can be blanked, thus avoiding unwanted color bands.

Figure 7:
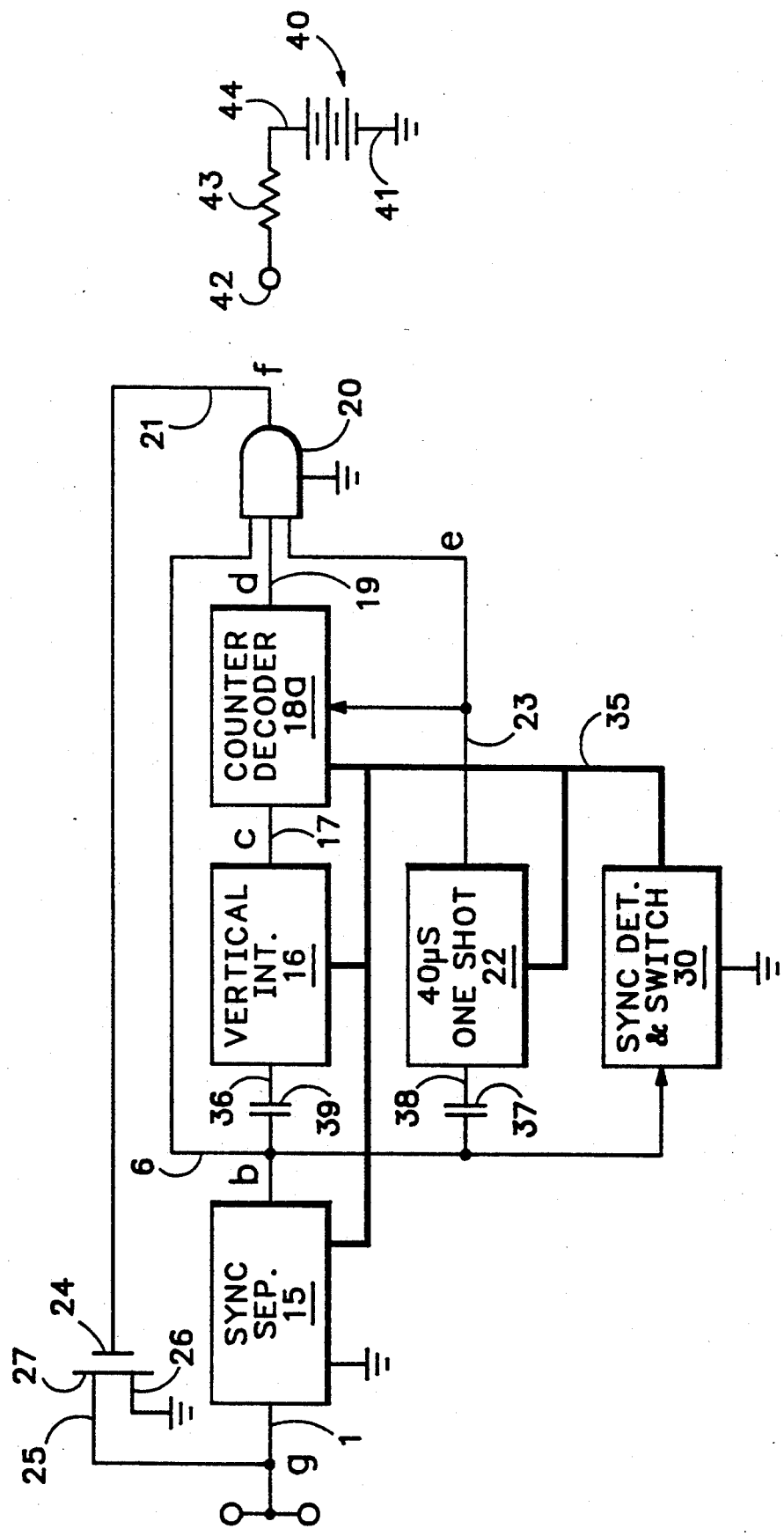
FIG. 7 is a block diagram of a circuit including the video sensor and power switch.

FIG. 7 shows the addition of a sync sensor and power switch 30 to the previous circuits. Terminal 44 of battery 40 supplies positive voltage to all circuits while resistor 43 protects the circuits against accidental reversal of the battery polarity. Circuits 15, 20 and 30 are connected to circuit ground 41 in such a manner that they are always supplied with full battery voltage. Circuits 16, 18a and 22 are not connected directly to ground; instead they are returned to lead 35 which can switch between ground and full battery voltage. When lead 35 is at full battery voltage, circuits 16, 18a and 22 are effectively turned-off by virtue of having no voltage difference between their power terminals. Sync separator 15 is connected to both power ground 41 and switched ground 35 for purposes that are described below. Capacitor 37 is interposed between the composite sync on lead 6 and the input 38 of one-shot 22, and capacitor 39 is interposed between the composite sync on lead 6 and the input 36 of vertical integrator 16. Both of the aforementioned capacitors provide DC isolation to save battery current during periods of no video. The capacitors prevent flow of current from vertical integrator 16 or one shot 16 into sync separator 15 when switched ground 35 is placed at its high potential level. If current were permitted to flow, lead 6 might be held high and the sync separator would not then be able to detect sync pulses.

Figure 8B:
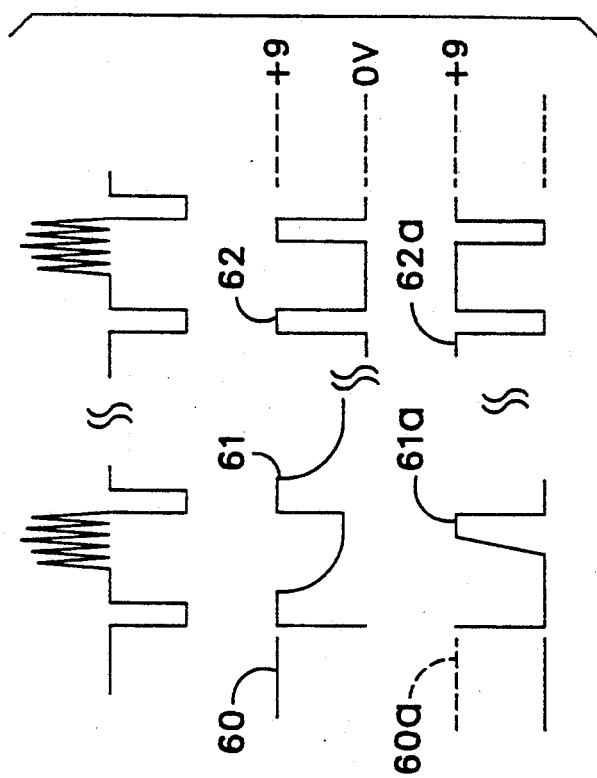
FIGS. 8A–8B are schematics of the preferred embodiment of the sync signal separator.
Figure 8A:
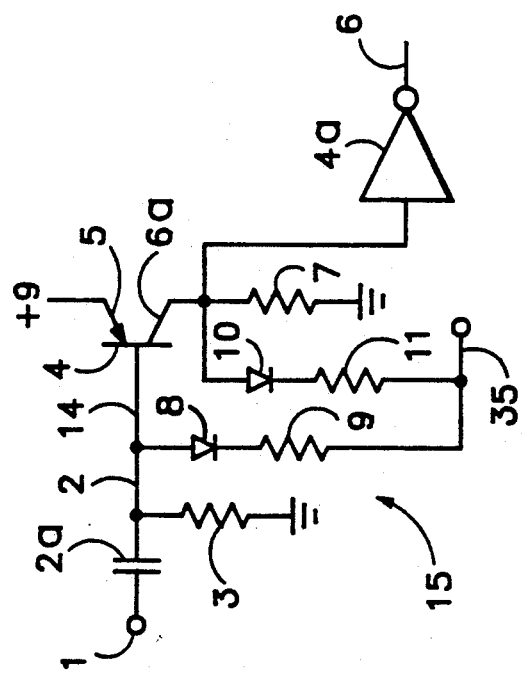

Referring to FIGS. 8A and 8B ordinary composite video is received on lead 1 and coupled to the base 14 of transistor 4 via coupling capacitor 2a and lead 2. Resistor 3 provides a slight bias to the base of transistor 4 such that the collector 6a supplies enough current to resistor 7 to pull the collector 6a effectively to the supply voltage as shown in waveform 60. Additionally, the emitter 5 of transistor 14 is connected to the positive voltage supply 42 (FIG. 7). When composite video is received, the negative tips of sync will be clamped by the base-emitter diode of transistor 4 at a voltage sufficient to turn the transistor ON. During those time periods in-between the tips of sync, the base voltage will be more positive and therefore turn the transistor OFF, producing collector waveform 61 or 62 and waveform 61a or 62a at output 6 of inverter 4a. This is an ordinary sync separator arrangement, but heretofore the resistor values had to be fairly low and consumed excessive power. When an attempt is made to use large value resistors in order to save battery current, circuit capacitances caused the waveforms to be unacceptably slow as shown by waveform 61 and 61a. In the present embodiment, large resistor values are used when there is no video present. When video is initially applied, the output sync pulses 61a are excessively wide. The power switch 30 senses these pulses and grounds lead 35. Series connected diode 10 and resistor 11 are connected from lead 35 to the collector 6a of transistor 4 and this effectively lowers the impedance at that point and overcomes circuit capacitance to produce a proper sync waveform as shown for waveform 62a. The base bias is optionally increased by the series connected resistor 9 and diode 8 connected between lead 35 and the base 14 of transistor 4.

Figure 9A:
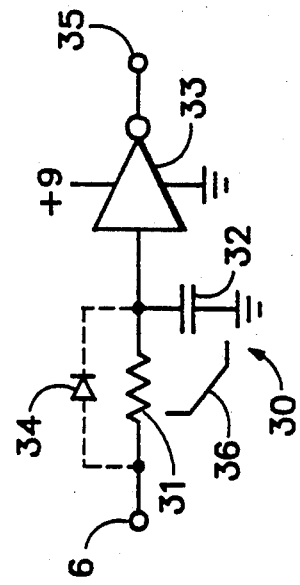
FIG. 9B shows waveforms associated with the video sensor and power switch of FIG. 9A, FIGS. 10A–10F show some modifications to the basic circuit.
Figure 9B:
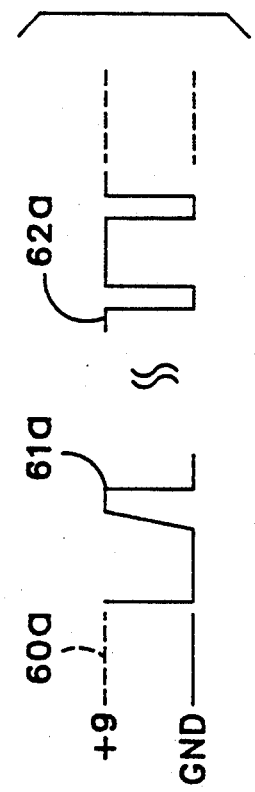

Referring to FIGS. 9A and 9B composite sync received on lead 6 is integrated by an integrator 36 consisting of resistor 31 and capacitor 32 to provide a DC voltage corresponding to whether or not sync is present on lead 6. By virtue of the bias on the base of transistor 4, collector 6a of transistor 4 will be near 9 volts when no video is present, waveform 60, and accordingly lead 6 will be at ground due to inverter 4a, waveform 60a. Lead 6 will be mostly at a positive voltage level when video is present, as shown in waveform 62a. Slow sync pulses, waveform 61a, will not reliably integrate to the required high voltage. Adding diode 34 across resistor 31 causes capacitor 32 to rapidly charge during the short positive excursions of waveform 61a, thus providing more reliable operation of the integrator.

Still referring to FIGS. 9A and 9B, the output of the integrator 36 is applied to the high impedance input of inverting amplifier 33 which has sufficient output current capacity to sink the ground return current of the circuits connected to its output at lead 35. An ordinary CMOS gate has been found sufficient for this purpose when the other circuits are also CMOS logic elements.

FIG. 10 shows several variations in the way that the FET 27 can be coupled to the video lead 1. FIG. 10a shows a resistor 50 between the FET drain 25 and the video lead 1. This arrangement is useful when it is desired to attenuate rather than suppress information in the video. FIG. 10b shows an inductor 51 between the FET drain 25 and the video lead 1. This arrangement provides a high pass function for information appearing during selected times within the vertical interval. FIG. 10c illustrates a capacitor 52 between the FET drain 25 and the video lead 1. This implements a selectable low pass filter. FIG. 10d shows that capacitor 52 may be replaced by a shunt tuned circuit 54 to implement a bandpass function. Additionally, in FIG. 10e, capacitor 52 may be replaced by a series tuned circuit 56 to implement a band stop function.

Figure 10A:
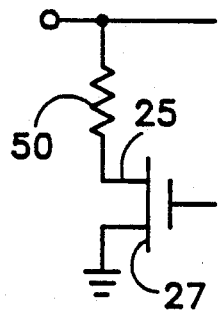
Figure 10B:
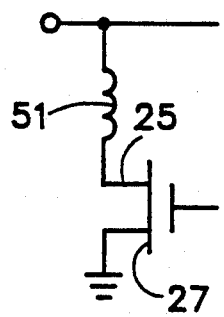
Figure 10C:
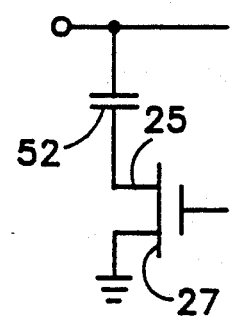
Figure 10D:
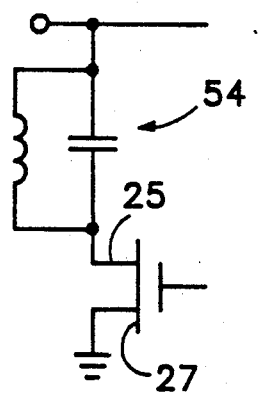
Figure 10E:
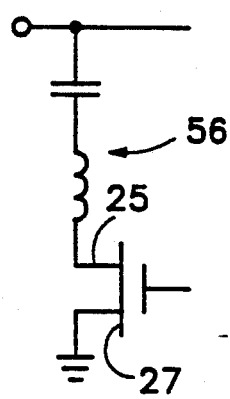
Figure 10F:
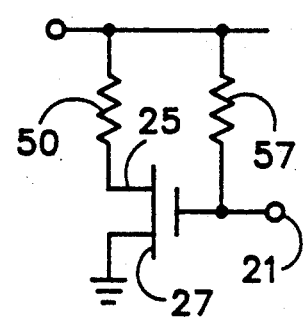
Figure 11:
FIG. 11 shows a waveform associated with the circuitry of FIG. 10.

FIG. 10f illustrates a resistor 57 connected between a source of pulses, lead 21, and the video signal on lead 1. This offsets selected portions of the video signal in a positive direction as is shown in FIG. 11.

Figure 12:
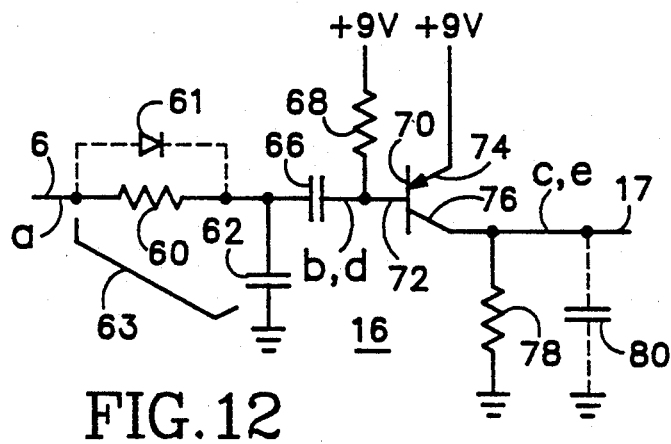
FIG. 12 is a schematic of a vertical integrator.

FIG. 12 shows a preferred embodiment of the vertical integrator. Composite sync waveform 13a is received on lead 6 and integrated by integrator 63, composed of series resistor 60 and shunt capacitor 62. Optionally, diode 61 may be connected across resistor 60 as described below. Capacitor 66 couples the integrated sync to the base 72 of transistor 70. The emitter 74 of transistor 70 is connected to the positive voltage supply, while its collector 76 is returned to ground through resistor 78. Output 17 is taken from collector 76. The base to emitter junction provides a negative tip clamping operation on the integrated sync such that the vertical sync pulse is clamped at a voltage equal to the supply voltage minus the base-emitter diode voltage. See FIG. 13b. Those most negative parts of waveform 13b will cause the transistor to conduct, giving a collector waveform as shown in FIG. 13c.

The leading edge 91 of the vertical sync output (FIG. 13c) occurs during the second vertical sync pulse 90. However, it is often desirable that this output occur during the first vertical sync pulse 89. To accomplish this, diode 61 is added across integrator resistor 60 with polarity such that it rapidly recharges the capacitor between sync pulses, giving an integrator output waveform 13d for application via capacitor 66 to the base 72 of transistor 70. The collector 76 output becomes as shown by FIG. 13e. It will be observed that the pulse train starts during the first vertical sync pulse 89.

Figure 13:
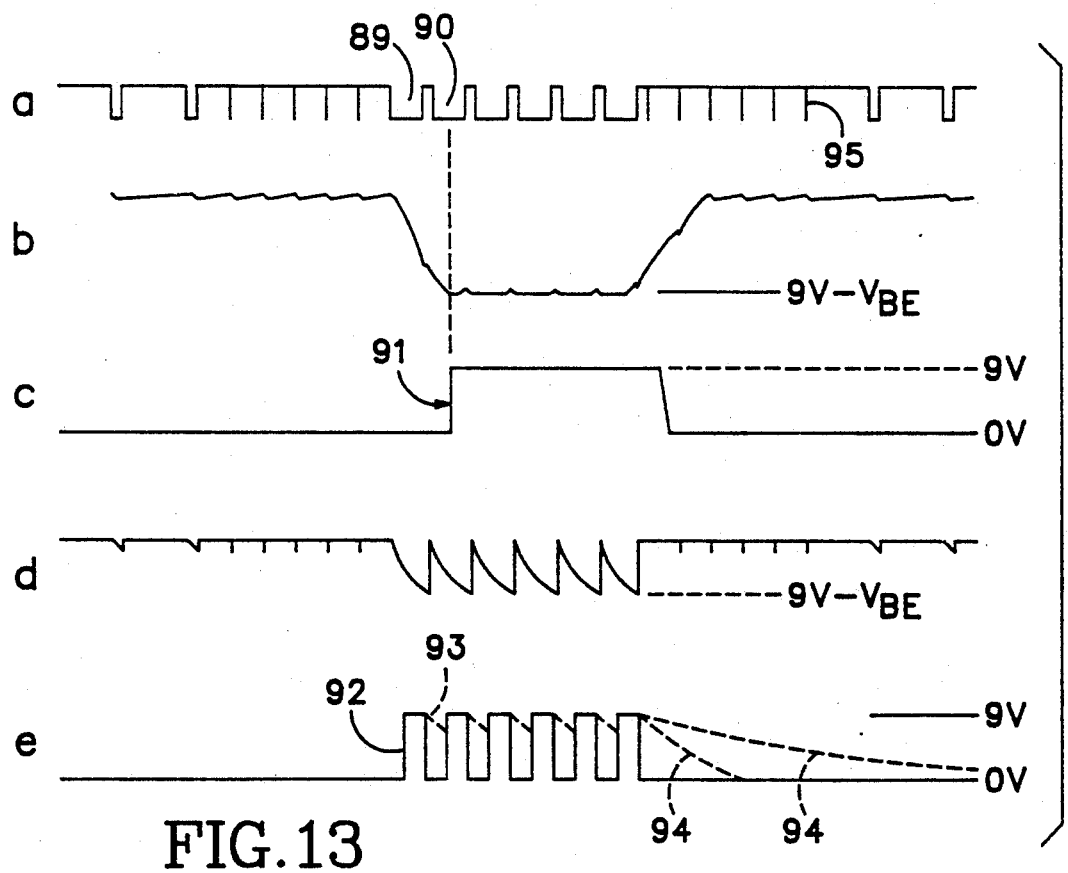
FIG. 13 shows waveforms associated with the vertical integrator of FIG. 12.

If a single output pulse is desirable, capacitor 80 may be added across collector resistor 78 in order to fill in the gaps 93 shown in FIG. 13e, by virtue of its charge storage characteristics. If capacitor 80 is made quite large, the trailing edge 94 can be delayed by a time corresponding to several lines of video and serve usefully to trigger a following circuit after the last vertical equalizing pulse 95.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A circuit for selectively modifying a composite video signal, said circuit having an input terminal for receiving the video signal and an output terminal connected directly to the input terminal and comprising:
   a sync separator connected to the input terminal for providing sync pulses from the video signal received at the input terminal,
   an integrator connected to the sync separator for providing a pulse responsive to vertical sync of the video signal,
   a first one-shot responsive to the pulse provided by the integrator for providing a pulse that starts within the vertical blanking interval of the video signal and ends at approximately the end of the vertical blanking interval of the video signal,
   a second one-short responsive to the leading edge of the sync pulses provided by the sync separator for providing a pulse lasting less than the period of the horizontal sync signal and more than half said period,
   gate means for providing an output pulse when the first and second one-shots are active and no pulse is provided by the sync separator, and
   a switch device connected between the input terminal and a reference potential level and responsive to the output pulse of the gate means.

2. A circuit according to claim 1, wherein the switch device comprises a transistor that defines a current path between first and second terminals of the transistor and has a control terminal for receiving a control signal that controls the state of the current path, said first and second terminals being connected to the input terminal of the circuit and the reference potential level respectively and said control terminal being connected to the gate means, the switch device being responsive to an output pulse provided by the gate means to place the current path between the first and second terminals in a conductive state.

3. A circuit according to claim 2, wherein the switch device comprises a resistor connected between the input terminal and the transistor.

4. A circuit according to claim 2, wherein the switch device comprises an inductor between the input terminal and the transistor.

5. A circuit according to claim 4, comprising a capacitor connected in parallel with the inductor.

6. A circuit according to claim 4, wherein the switch device comprises a capacitor connected in series with the inductor.

7. A circuit according to claim 2, wherein the switch device comprises a capacitor connected between the input terminal and the transistor.

8. A circuit according to claim 2, wherein the switch device comprises a first resistor connected between the input terminal and the first terminal of the transistor and a second resistor connected between the input terminal and the control terminal of the transistor.

9. A circuit for selectively modifying a composite video signal including picture information, a horizontal sync signal and a vertical sync signal, said circuit having an input terminal for receiving the video signal and an output terminal connected directly to the input terminal and comprising:
  a sync separator connected to the input terminal and responsive to the video signal for providing horizontal and vertical sync pulses,
  an integrator connected to the sync separator for providing a pulse responsive to vertical sync of the video signal,
  a first one-shot responsive to the pulse provided by the integrator for providing a pulse that starts during the vertical blanking interval and last until approximately the end of the vertical blanking interval,
  a second one-short responsive to sync pulses provided by the sync separator for providing a pulse that lasts less than the period of the horizontal sync signal and more than half said period,
  gate means for providing an output pulse when the first and second one-shots are active, and
  a switch device connected to the input terminal and responsive to the output pulse of the gate means.

10. A circuit according to claim 9, wherein the switch device comprises a transistor that defines a current path between first and second terminals of the transistor and has a control terminal for receiving a control signal that controls the state of the current path, said first terminal being connected to the input terminal of the circuit and said control terminal being connected to the gate means.

11. A circuit according to claim 10, wherein said second terminal is connected to a reference potential level and the switch device is responsive to an output pulse provided by the gate means to place the current path between the first and second terminals in a conductive state.

12. A circuit according to claim 10, wherein the switch device comprises a resistor connected between the input terminal and the transistor.

13. A circuit according to claim 10, wherein the switch device comprises an inductor connected between the input terminal and the transistor.

14. A circuit according to claim 13, comprising a capacitor connected in parallel with the inductor.

15. A circuit according to claim 13, wherein the switch device comprises a capacitor connected in series with the inductor.

16. A circuit according to claim 10, wherein the switch device comprises a capacitor connected between the input terminal and the transistor.

17. A circuit according to claim 10, wherein the switch device comprises a first resistor connected between the input terminal and the first terminal of the transistor and a second resistor connected between the input terminal and the control terminal of the transistor.

18. A circuit for selectively modifying a composite video signal, said circuit having an input terminal for receiving the video signal and an output terminal connected directly to the input terminal and comprising:
  a sync separator connected to the input terminal for providing sync pulses from the video signal received at the input terminal,
  an integrator connected to the sync separator for providing a pulse responsive to vertical sync of the video signal,
  a one-shot responsive to the sync pulses provided by the sync separator for providing an output pulse lasting less than the period of the horizontal sync signal and more than half said period,
  a counter-decoder that counts output pulses provided by the one-shot and is reset by the pulse provided by the integrator and provides an output pulse beginning after the beginning of the pulse provided by the integrator and lasting until approximately the end of the vertical blanking interval of the video signal,
  gate means for providing an output pulse when output pulses of the counter-decoder and the one-shot are present and no sync pulse is provided by the sync separator, and
  a switch device connected between the input terminal and a reference potential level and responsive to the output pulse of the gate means.

19. A circuit according to claim 18, wherein the counter-decoder also provides an output pulse that begins before the beginning of the vertical blanking interval and ends within the vertical blanking interval at a predetermined time before the start of the pulse provided by the integrator.

20. A circuit according to claim 18, comprising a d.c. power supply having a first and second terminals, a power supply conductor, and a sync detector responsive to sync pulses provided by the sync separator for establishing an electrically conductive connection between said power supply, and wherein the one-shot has a power supply terminal connected tot he power supply conductor, whereby the power supply terminal of the one-shot is connected to the first terminal of the power supply only when the sync detector detects sync pulses provided by the sync separator.

21. A circuit according to claim 20, comprising a capacitor connected between the one-shot and the sync separator for isolating the sync separator and the one-shot.

22. A circuit according to claim 18, wherein the switch device comprises a transistor that defines a current path between first and second terminals of the transistor and has a control terminal for receiving a control signal that controls the state of the current path, said first terminal being connected to the input terminal of the circuit and said control terminal being connected to the gate means.

23. A circuit according to claim 22, wherein said second terminal is connected to the reference potential level and the transistor is responsive to an output pulse provided by the gate means to place the current path between the first and second terminals in a conductive state.

24. A circuit according to claim 22, wherein the switch device comprises a resistor connected between the input terminal and the transistor.

25. A circuit according to claim 22, wherein the switch device comprises an inductor connected between the input terminal and the transistor.

26. A circuit according to claim 25, wherein the switch device comprises a capacitor connected in parallel with the inductor.

27. A circuit according to claim 25, wherein the switch device comprises a capacitor connected in series with the inductor.

28. A circuit according to claim 22, wherein the switch device comprises a capacitor connected between the input terminal and the transistor.

29. A circuit according to claim 22, wherein the switch device comprises a first resistor connected between the input terminal and the first terminal of the transistor and a second resistor connected between the input terminal and the control terminal of the transistor.

30. A circuit for selectively modifying a composite video signal including picture information, a horizontal sync signal and a vertical sync signal, said circuit having an input terminal for receiving the video signal and an output terminal connected directly to the input terminal and comprising:
   a sync separator connected to the input terminal and responsive to the video signal for providing horizontal and vertical sync pulses,
   an integrator connected to the sync separator for providing a pulse responsive to vertical sync of the video signal,
   a first one-shot responsive to the pulse provided by the integrator for providing a pulse that starts during the vertical blanking interval and last until approximately the end of the vertical blanking interval,
   a second one-short responsive to sync pulses provided by the sync separator for providing a pulse that lasts less than the period of the horizontal sync signal and more than half said period,
   gate means having an output that is placed at a predetermined potential when the first and second one-shots are active, and
   a resistor connected between the input terminal and the output of the gate means.

31. A circuit for selectively modifying a composite video signal, said circuit having an input terminal for receiving the video signal and an output terminal connected directly to the input terminal and comprising:
   a sync separator connected to the input terminal for providing sync pulses from the video signal received at the input terminal,
   an integrator connected to the sync separator for providing a pulse responsive to vertical sync of the video signal,
   a one-shot responsive to the sync pulses provided by the sync separator for providing an output pulse lasting less than the period of the horizontal sync signal and more than half said period,
   a counter-decoder that counts output pulses provided by the one-shot and is reset by the pulse provided by the integrator and provides an output pulse beginning before the beginning of the vertical blanking interval and ending a predetermined time before the start of the pulse provided by the integrator,
   gate means for providing an output pulse when output pulses of the counter-decoder and the one-shot are present and no sync pulse is provided by the sync separator, and
   a switch device connected between the input terminal and a reference potential level and responsive to the output pulse of the gate means.

32. A circuit according to claim 31, wherein said predetermined time is approximately equal to the interval between two consecutive horizontal sync pulses.

* * * * *